(12) United States Patent
Wiedenhoefer et al.

(10) Patent No.: US 11,525,637 B2
(45) Date of Patent: Dec. 13, 2022

(54) AIRCRAFT HEAT EXCHANGER FINNED PLATE MANUFACTURE

(71) Applicant: Raytheon Technologies Corporation, Farmington, CT (US)

(72) Inventors: James F. Wiedenhoefer, Windsor, CT (US); Russell J. Bergman, South Windsor, CT (US); William P. Stillman, Boulder, CO (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/137,946

(22) Filed: Dec. 30, 2020

(65) Prior Publication Data

US 2021/0222962 A1     Jul. 22, 2021

Related U.S. Application Data (60) Provisional application No. 62/963,068, filed on Jan. 19, 2020.

(51) Int. Cl.
| | | |
|---|---|---|
| *F28F 3/04* | (2006.01) | |
| *B21D 53/02* | (2006.01) | |
| *F28F 3/02* | (2006.01) | |
| *B21D 13/00* | (2006.01) | |
| *B23P 15/26* | (2006.01) | |
| *B21D 53/04* | (2006.01) | |

(52) U.S. Cl.
CPC .............. *F28F 3/046* (2013.01); *B21D 13/00* (2013.01); *B21D 53/02* (2013.01); *B21D 53/022* (2013.01); *B23P 15/26* (2013.01); *F28F 3/025* (2013.01); *B21D 53/04* (2013.01); *F28F 2240/00* (2013.01); *F28F 2275/04* (2013.01)

(58) Field of Classification Search
CPC ...... B21D 13/00; B21D 53/02; B21D 53/022; B21D 53/04; B23P 15/26
See application file for complete search history.

(56) References Cited

U.S. PATENT DOCUMENTS

| | | | |
|---|---|---|---|
| 3,552,488 A | * | 1/1971 | Grill ..................... F28D 9/0025 165/DIG. 399 |
| 4,438,809 A | | 3/1984 | Papis |
| 4,520,868 A | | 6/1985 | Grawey |

(Continued)

FOREIGN PATENT DOCUMENTS

| | | | | |
|---|---|---|---|---|
| CN | 101309577 A | * | 11/2008 | ......... H01L 23/3672 |
| CN | 108869044 A | | 11/2018 | |

(Continued)

OTHER PUBLICATIONS

European Search Report and Opinion dated Oct. 20, 2021 for European Patent Application No. 20218011.3.

(Continued)

*Primary Examiner* — Sarang Afzali
(74) *Attorney, Agent, or Firm* — Bachman & LaPointe, P.C.

(57) ABSTRACT

A method for forming a heat exchanger plate includes: securing a wave form metallic sheet to a heat exchanger plate substrate, the substrate comprising a first face and a second face opposite the first face, the securing of the wave form metallic sheet being to the first face; and removing peaks of the sheet.

22 Claims, 12 Drawing Sheets

(56) References Cited

U.S. PATENT DOCUMENTS

| | | | |
|---|---|---|---|
| 4,715,431 A * | 12/1987 | Schwarz | F25J 5/005 |
| | | | 165/913 |
| 5,009,263 A * | 4/1991 | Seshimo | F28F 1/20 |
| | | | 165/181 |
| 5,107,922 A * | 4/1992 | So | F28F 3/027 |
| | | | 165/154 |
| 5,531,268 A | 7/1996 | Hoshino et al. | |
| 5,718,127 A * | 2/1998 | Aitken | F28F 25/087 |
| | | | 196/100 |
| 6,134,880 A | 10/2000 | Yoshinaka | |
| 6,430,931 B1 | 8/2002 | Horner | |
| 6,607,026 B1 | 8/2003 | Naji et al. | |
| 7,334,411 B2 | 2/2008 | Vandermolen | |
| 7,770,633 B2 * | 8/2010 | Miyahara | F28D 15/046 |
| | | | 165/130 |
| 7,784,528 B2 | 8/2010 | Ottow et al. | |
| 7,861,512 B2 | 1/2011 | Olver et al. | |
| 7,950,149 B2 * | 5/2011 | Golecki | H01L 21/4878 |
| | | | 205/640 |
| 8,181,443 B2 | 5/2012 | Rago | |
| 8,266,888 B2 | 9/2012 | Liu | |
| 8,387,362 B2 | 3/2013 | Storage et al. | |
| 8,438,835 B2 | 5/2013 | Perveiler et al. | |
| 8,573,291 B2 | 11/2013 | Vick | |
| 8,689,547 B2 | 4/2014 | Burgers et al. | |
| 8,770,269 B2 | 7/2014 | Scott | |
| 8,784,047 B2 | 7/2014 | Elder | |
| 9,200,855 B2 | 12/2015 | Kington et al. | |
| 9,243,563 B2 | 1/2016 | Lo | |
| 9,328,968 B2 | 5/2016 | Vanderwees | |
| 9,377,250 B2 | 6/2016 | Landre | |
| 9,732,702 B2 | 8/2017 | Ueda | |
| 9,752,803 B2 * | 9/2017 | Matter, III | F25B 13/00 |
| 9,766,019 B2 | 9/2017 | Eleftheriou et al. | |
| 9,771,867 B2 | 9/2017 | Karam et al. | |
| 9,816,766 B2 | 11/2017 | Miller et al. | |
| 9,835,043 B2 | 12/2017 | Kantany et al. | |
| 9,851,159 B2 | 12/2017 | Cameron | |
| 9,909,812 B2 | 3/2018 | Peskos et al. | |
| 9,982,630 B2 | 5/2018 | Marini et al. | |
| 10,041,741 B2 | 8/2018 | Turcotte et al. | |
| 10,100,740 B2 | 10/2018 | Thomas | |
| 10,125,684 B2 | 11/2018 | Yu | |
| 10,175,003 B2 | 1/2019 | Sennoun et al. | |
| 10,184,400 B2 | 1/2019 | Cerny et al. | |
| 10,208,621 B2 | 2/2019 | Hoefler et al. | |
| 10,222,142 B2 | 3/2019 | Alvarez et al. | |
| 10,316,750 B2 | 6/2019 | Loebig et al. | |
| 10,422,585 B2 | 9/2019 | Jensen et al. | |
| 10,480,407 B2 | 11/2019 | Alecu | |
| 10,926,364 B2 * | 2/2021 | Thresher | B23H 1/00 |
| 11,219,841 B2 * | 1/2022 | Wan | F28D 15/0266 |
| 2001/0018024 A1 | 8/2001 | Hyde et al. | |
| 2004/0026072 A1 | 2/2004 | Yi et al. | |
| 2004/0040153 A1 * | 3/2004 | Ashida | B23K 1/008 |
| | | | 228/141.1 |
| 2004/0111829 A1 | 6/2004 | Bruno et al. | |
| 2009/0169359 A1 | 7/2009 | Murphy et al. | |
| 2010/0084120 A1 | 4/2010 | Yin et al. | |
| 2010/0170262 A1 | 7/2010 | Kaslusky et al. | |
| 2011/0088405 A1 | 4/2011 | Turco | |
| 2011/0146944 A1 | 6/2011 | Hand et al. | |
| 2011/0168366 A1 | 7/2011 | Garret et al. | |
| 2013/0199152 A1 | 8/2013 | Menheere et al. | |
| 2013/0213623 A1 * | 8/2013 | Perocchio | F28F 3/12 |
| | | | 165/170 |
| 2014/0246179 A1 | 9/2014 | Vallee et al. | |
| 2015/0047818 A1 | 2/2015 | Peskos et al. | |
| 2015/0047820 A1 | 2/2015 | Rhoden | |
| 2016/0069266 A1 | 3/2016 | Murphy et al. | |
| 2016/0123230 A1 | 5/2016 | Thomas | |
| 2016/0177828 A1 | 6/2016 | Snyder et al. | |
| 2016/0230669 A1 | 8/2016 | Selstad et al. | |
| 2016/0362999 A1 | 12/2016 | Ho | |
| 2017/0009703 A1 | 1/2017 | Moon et al. | |
| 2017/0184024 A1 | 6/2017 | Sennoun | |
| 2017/0363361 A1 | 12/2017 | Turney | |
| 2018/0051935 A1 | 2/2018 | Roberge | |
| 2018/0058472 A1 | 3/2018 | Tajiri et al. | |
| 2018/0172368 A1 | 6/2018 | Kowalski et al. | |
| 2018/0238238 A1 | 8/2018 | Luschek et al. | |
| 2018/0238285 A1 | 8/2018 | Pollard et al. | |
| 2018/0244127 A1 | 8/2018 | Sennoun et al. | |
| 2018/0245853 A1 | 8/2018 | Sennoun et al. | |
| 2018/0258859 A1 | 9/2018 | Suciu et al. | |
| 2018/0292140 A1 | 10/2018 | Mayo et al. | |
| 2019/0154345 A1 | 5/2019 | Martinez et al. | |
| 2019/0170445 A1 | 6/2019 | McCaffrey | |
| 2019/0170455 A1 | 6/2019 | McCaffrey | |
| 2019/0204012 A1 | 7/2019 | Army et al. | |
| 2019/0212074 A1 | 7/2019 | Lockwood et al. | |
| 2019/0234690 A1 | 8/2019 | Sobolak et al. | |
| 2019/0277571 A1 | 9/2019 | Disori et al. | |
| 2019/0277579 A1 | 9/2019 | Disori et al. | |
| 2019/0293365 A1 | 9/2019 | Disori et al. | |
| 2019/0293366 A1 * | 9/2019 | Disori | F28F 1/025 |
| 2019/0310030 A1 | 10/2019 | Disori et al. | |
| 2019/0339012 A1 | 11/2019 | Disori et al. | |
| 2020/0189046 A1 * | 6/2020 | Ravindranath | F28F 1/26 |
| 2020/0347737 A1 | 11/2020 | Bordoni | |
| 2020/0395890 A1 * | 12/2020 | Hutting | H05K 7/2039 |
| 2021/0207535 A1 | 7/2021 | Bergman et al. | |
| 2021/0222624 A1 | 7/2021 | Wiedenhoefer et al. | |
| 2021/0222963 A1 | 7/2021 | Bergman et al. | |
| 2021/0285375 A1 | 9/2021 | Wiedenhoefer et al. | |
| 2021/0318071 A1 | 10/2021 | Hart et al. | |

FOREIGN PATENT DOCUMENTS

| | | | | |
|---|---|---|---|---|
| FR | 3075870 A1 | 6/2019 | | |
| JP | H0961084 A | 3/1997 | | |
| JP | 11148793 A | * | 6/1999 | F28F 3/027 |
| WO | 2021/138307 A1 | 7/2021 | | |
| WO | 2021/146674 A1 | 7/2021 | | |

OTHER PUBLICATIONS

U.S. Office Action dated Nov. 9, 2021 for U.S. Appl. No. 17/139,174.
International Search Report and Written Opinion dated Mar. 31, 2021 for PCT/US21/13804.
European Search Report dated Feb. 7, 2022 for European Patent Application No. 21740964.8 (EP stage of PCT/US2021/013804—WO/2021/146674).
U.S. Office Action dated Dec. 13, 2021 for U.S. Appl. No. 17/124,551.
International Search Report and Written Opinion dated Mar. 19, 2021 for PCT/US20/67289.
European Search Report dated Nov. 25, 2021 for European Patent Application No. 20910078.3 (EP stage of PCT/US2020/067289—WO/2021/138307).
European Search Report dated Nov. 19, 2021 for European Patent Application No. 21191780.2 (EP stage of PCT/US2020/067289—WO/2021/138307).
Extended European Search Report dated Mar. 31, 2022 for European Patent Application No. 20910078.3 (EP stage of PCT/US20/67289—WO/2021/138307).
Extended European Search Report dated Mar. 31, 2022 for European Patent Application No. 21191780.2 (EP divisional of PCT/US20/67289—WO/2021/138307).
Chris Wiegand et al., "F-35 Air Vehicle Technology Overview", Aviation Technology, Integration, and Operations Conference, Jun. 2018, American Institute of Aeronautics and Astronautics, Inc., Reston, Virginia.
Jonathan Lowell, "Keeping Cool over Salt Lake", Aug. 25, 2019, US Air Force, Washington, DC, retrieved from internet Nov. 9, 2019 https://www.af.mil/News/Commentaries/Display/Article/1941943/keeping-cool-over-salt-lake/.

(56) References Cited

OTHER PUBLICATIONS

Sean Robert Nuzum, Thesis: "Aircraft Thermal Management using Liquefied Natural Gas", Apr. 27, 2016, Wright State University, Dayton, Ohio.

* cited by examiner

AIRCRAFT HEAT EXCHANGER FINNED PLATE MANUFACTURE

CROSS-REFERENCE TO RELATED APPLICATION

Benefit is claimed of U.S. Patent Application No. 62/963,068, filed Jan. 19, 2020, and entitled "Aircraft Heat Exchanger Finned Plate Manufacture", the disclosure of which is incorporated by reference herein in its entirety as if set forth at length.

BACKGROUND

The disclosure relates to gas turbine engine heat exchangers. More particularly, the disclosure relates to air-to-air heat exchangers.

Examples of gas turbine engine heat exchangers are found in: United States Patent Application Publication 20190170445A1 (the '445 publication), McCaffrey, Jun. 6, 2019, "HIGH TEMPERATURE PLATE FIN HEAT EXCHANGER"; United States Patent Application Publication 20190170455A1 (the '455 publication), McCaffrey, Jun. 6, 2019, "HEAT EXCHANGER BELL MOUTH INLET"; and United States Patent Application Publication 20190212074A1 (the '074 publication), Lockwood et al., Jul. 11, 2019, "METHOD FOR MANUFACTURING A CURVED HEAT EXCHANGER USING WEDGE SHAPED SEGMENTS", the disclosures of which three publications are incorporated by reference in their entireties herein as if set forth at length.

An exemplary positioning of such a heat exchanger provides for the transfer of thermal energy from a flow (heat donor flow) diverted from an engine core flow to a bypass flow (heat recipient flow). For example, air is often diverted from the compressor for purposes such as cooling. However, the act of compression heats the air and reduces its cooling effectiveness. Accordingly, the diverted air may be cooled in the heat exchanger to render it more suitable for cooling or other purposes. One particular example draws the heat donor airflow from a diffuser case downstream of the last compressor stage upstream of the combustor. This donor flow transfers heat to a recipient flow which is a portion of the bypass flow. To this end, the heat exchanger may be positioned within a fan duct or other bypass duct. The cooled donor flow is then returned to the engine core (e.g., radially inward through struts) to pass radially inward of the gas path and then be passed rearward for turbine section cooling including the cooling of turbine blades and vanes. The heat exchanger may conform to the bypass duct. The bypass duct is generally annular. Thus, the heat exchanger may occupy a sector of the annulus up to the full annulus.

Other heat exchangers may carry different fluids and be in different locations. For example, instead of rejecting heat to an air flow in a bypass duct, other heat exchangers may absorb heat from a core flow (e.g., as in recuperator use). Among further uses for heat exchangers in aircraft are power and thermal management systems (PTMS) also known as integrated power packages (IPP). One example is disclosed in United States Patent Application publication 20100170262A1, Kaslusky et al., Jul. 8, 2010, "AIRCRAFT POWER AND THERMAL MANAGEMENT SYSTEM WITH ELECTRIC CO-GENERATION". Another example is disclosed in United States Patent Application publication 20160362999A1, Ho, Dec. 15, 2016, "EFFICIENT POWER AND THERMAL MANAGEMENT SYSTEM FOR HIGH PERFORMANCE AIRCRAFT". Another example is disclosed in United States Patent Application publication 20160177828A1, Snyder et al., Jun. 23, 2016, "STAGED HEAT EXCHANGERS FOR MULTI-BYPASS STREAM GAS TURBINE ENGINES".

U.S. Pat. No. 10,100,740 (the '740 patent, the disclosure of which is incorporated by reference in its entirety herein as if set forth at length), to Thomas, Oct. 16, 2018, "Curved plate/fin heater exchanger", shows attachment of a square wave form fin array to the side of a heat exchanger plate body. For plates in a radial array, the wave amplitude progressively increases to accommodate a similar increase in inter-plate spacing.

SUMMARY

One aspect of the disclosure involves a method for forming a heat exchanger plate. The method comprises: securing a wave form metallic sheet to a heat exchanger plate substrate, the substrate comprising a first face and a second face opposite the first face, the securing of the wave form metallic sheet being to the first face; and removing peaks of the sheet.

A further embodiment of any of the foregoing embodiments may additionally and/or alternatively include securing a second wave form metallic sheet to the second face and removing peaks of the second sheet.

A further embodiment of any of the foregoing embodiments may additionally and/or alternatively include the removing comprising electro-discharge machining.

A further embodiment of any of the foregoing embodiments may additionally and/or alternatively include the removing comprising wire electro-discharge machining.

A further embodiment of any of the foregoing embodiments may additionally and/or alternatively include the removing comprising wire electro-discharge machining with a wire removing the peaks in a single traversal.

A further embodiment of any of the foregoing embodiments may additionally and/or alternatively include the removing progressively more from one peak of the wave to the next across a majority of a footprint of the sheet.

A further embodiment of any of the foregoing embodiments may additionally and/or alternatively include the wave form being a square wave form.

A further embodiment of any of the foregoing embodiments may additionally and/or alternatively include the securing comprising brazing.

A further embodiment of any of the foregoing embodiments may additionally and/or alternatively include the substrate comprising a casting.

A further embodiment of any of the foregoing embodiments may additionally and/or alternatively include the substrate comprising a first edge having at least one port and the waves of the wave form are within 10° of parallel to the first edge.

Another aspect of the disclosure involves a method for forming a heat exchanger plate. A precursor is provided having a body with a first face and a second face opposite the first face and a plurality of first fin precursors protruding from the first face and second fin precursors protruding from the second face. Material is removed from the first fin precursors and the second fin precursors via wire electro-discharge machining.

A further embodiment of any of the foregoing embodiments may additionally and/or alternatively include: (1) the precursor comprising said body integrally cast with said first and second fin precursors; or (2) the precursor comprising: a plurality of said first fin precursors as legs of a first wave-form sheet metal piece and one or more others of said first fin precursors as portions of said body as a casting; and a plurality of said second fin precursors as legs of a second wave-form sheet metal piece and one or more others of said second fin precursors as portions of said body as a casting.

A further embodiment of any of the foregoing embodiments may additionally and/or alternatively include a method for forming a heat exchanger. The method comprising: forming, to the method above, a plurality of heat exchanger plates; and securing the plurality of heat exchanger plates to at least one manifold with a progressively varying orientation.

A further embodiment of any of the foregoing embodiments may additionally and/or alternatively include the at least one manifold being arcuate and the arcuateness provides the progressively varying orientation.

A further embodiment of any of the foregoing embodiments may additionally and/or alternatively include each said substrate comprising: at least one port mated to the manifold; and at least one internal passageway.

Another aspect of the disclosure involves a heat exchanger plate for providing heat transfer between a first flow along a first flowpath and a second flow along a second flowpath. The heat exchanger plate comprises a substrate having: a first face and a second face opposite the first face; a leading edge along the second flowpath and a trailing edge along the second flowpath; a proximal edge having at least one inlet port along the first flowpath and at least one outlet port along the first flowpath; and at least one passageway along the first flowpath between the at least one inlet port of the plate and the at least one outlet port of the plate. The heat exchanger plate further comprises a plurality of fin structures along the first face, each fin structure comprising: a base secured to the first face; and a first fin and a second fin extending from respective first and second edges of the base to respective first and second free edges.

A further embodiment of any of the foregoing embodiments may additionally and/or alternatively include the fin structures being arrayed in parallel and progressively change in height from the first face from one fin structure to the next.

A further embodiment of any of the foregoing embodiments may additionally and/or alternatively include the heat exchanger plate further comprising a plurality of second fin structures along the second face, each second fin structure comprising: a base secured to the second face; and a first fin and a second fin extending from respective first and second edges of the second fin structure base to respective first and second free edges.

A further embodiment of any of the foregoing embodiments may additionally and/or alternatively include a heat exchanger for providing heat transfer between a first flow along a first flowpath and a second flow along a second flowpath. The heat exchanger comprising: at least one plate bank comprising a plurality of plates described above. For each plate, the fin structures are arrayed in parallel and progressively change in height from the first face from one fin structure to the next. Within each plate bank, the progressive change in fin height accommodates a progressive change in plate orientation from one plate to the next.

A further embodiment of any of the foregoing embodiments may additionally and/or alternatively include: an inlet manifold having at least one inlet port and at least one outlet port; and an outlet manifold having at least one outlet port and at least one inlet port, the first flowpath passing from the at least one inlet port of the inlet manifold, through the at least one passageway of each of the plurality of plates, and through the at least one outlet port of the outlet manifold.

A further embodiment of any of the foregoing embodiments may additionally and/or alternatively include the inlet manifold and outlet manifold being arcuate having a convex first face and a concave second face. The at least one plate bank is mounted to the convex first faces.

A further embodiment of any of the foregoing embodiments may additionally and/or alternatively include a gas turbine engine including the heat exchanger. The first flow is a bleed flow and the second flow is a bypass flow.

The details of one or more embodiments are set forth in the accompanying drawings and the description below. Other features, objects, and advantages will be apparent from the description and drawings, and from the claims.

BRIEF DESCRIPTION OF THE DRAWINGS

Like Reference Numbers and Designations in the Various Drawings Indicate Like Elements.

DETAILED DESCRIPTION

Figure 1:
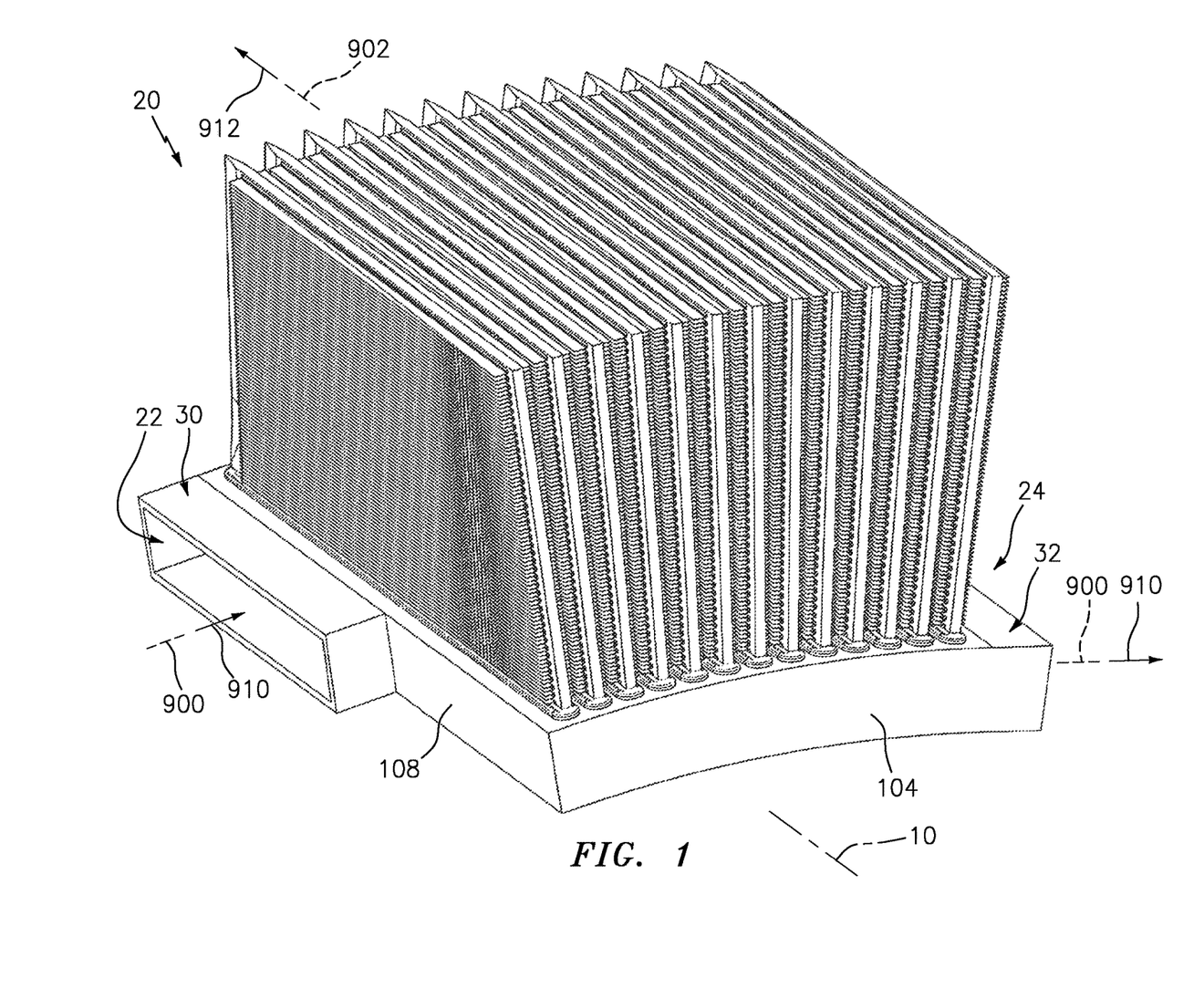
FIG. 1 is a schematic view of a heat exchanger.

FIG. 1 shows a gas turbine engine heat exchanger 20 providing heat exchange between a first flowpath 900 and a second flowpath 902 and thus between their respective first and second fluid flows 910 and 912. In the exemplary embodiment, the flowpaths 900, 902 are gas flowpaths passing respective gas flows 910, 912. In the illustrated example, the first flow 910 enters and exits the heat exchanger 20 as a single piped flow and exits as a single piped flow 910; whereas the flow 912 is sector portion of an axial annular flow surrounding a central longitudinal axis (centerline) 10 of the heat exchanger and associated engine. For purposes of schematic illustration, the exemplary heat exchanger 20 is shown shaped to occupy approximately 20° of a 360° annulus. There may be multiple such heat exchangers occupying the full annulus or one or more such heat exchangers occupying only a portion of the annulus.

Other connections are also possible. For example, a configuration with a single first flow inlet and branched first flow outlets is shown in copending U.S. patent application No. 62/957,091 (the '091 application), filed Jan. 3, 2020, and entitled "Aircraft Heat Exchanger Assembly", the disclosure of which is incorporated by reference herein in its entirety as if set forth at length.

The heat exchanger 20 has an inlet 22 and outlet 24 for the first flow. The exemplary inlet and outlet are, respectively, ports of an inlet manifold 26 (FIG. 2) and an outlet manifold 28 (discussed below) shown formed as portions of a combined manifold structure/unit 29. The manifold 29 has a first face 100 (outer diameter (OD) in the example), an opposite second face 102 (inner diameter (ID) in the example), a leading end 104, a trailing end 106, and lateral (circumferential (circumferentially facing) in the example) ends/edges 108, 110. In the particular arcuate manifold example, the OD face is convex and the ID face concave. Thus the respective manifold OD and ID surfaces/faces are portions of the faces 100 and 102

Figure 2:
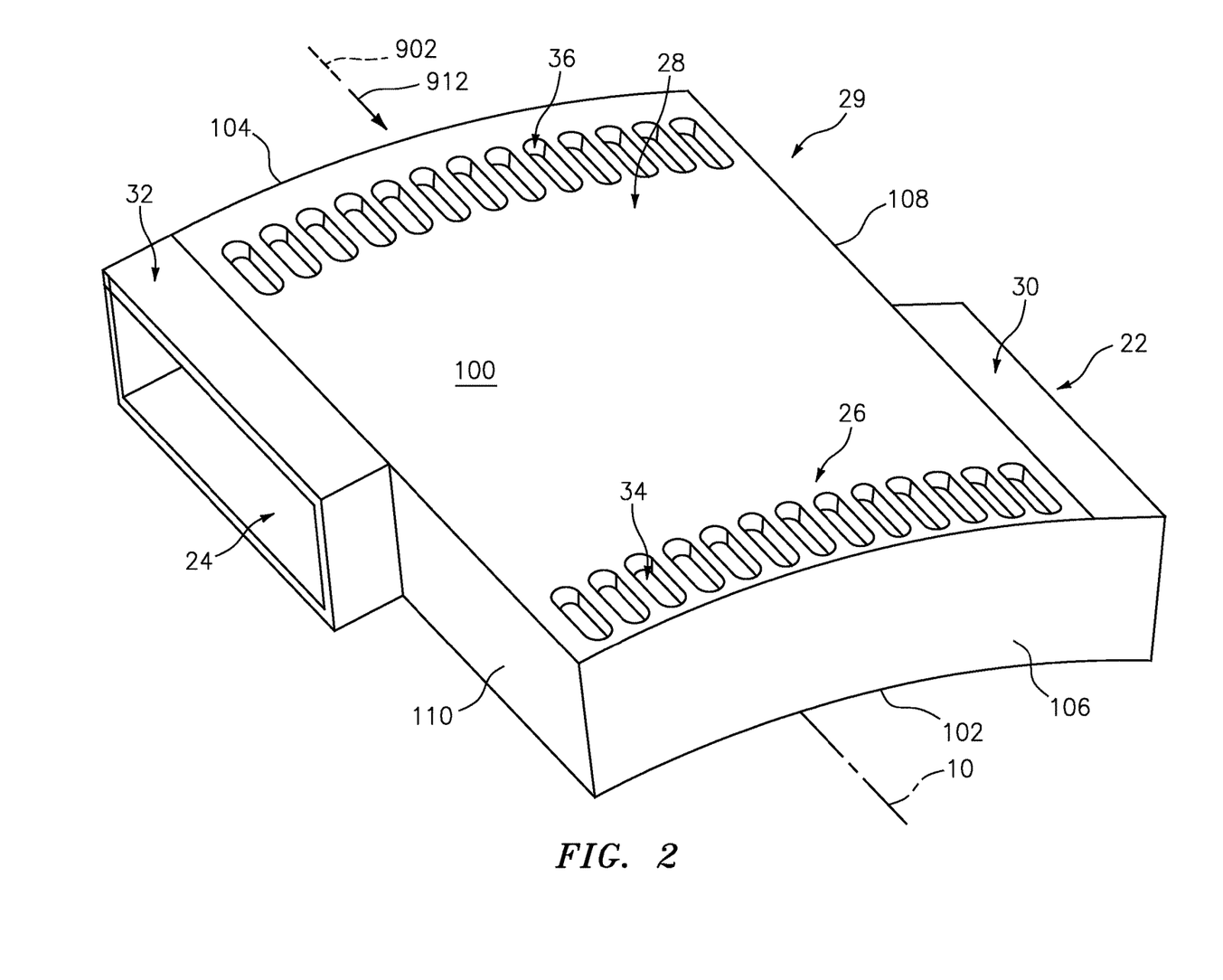
FIG. 2 is a view of a manifold unit of the heat exchanger of FIG. 1.
Figure 3:
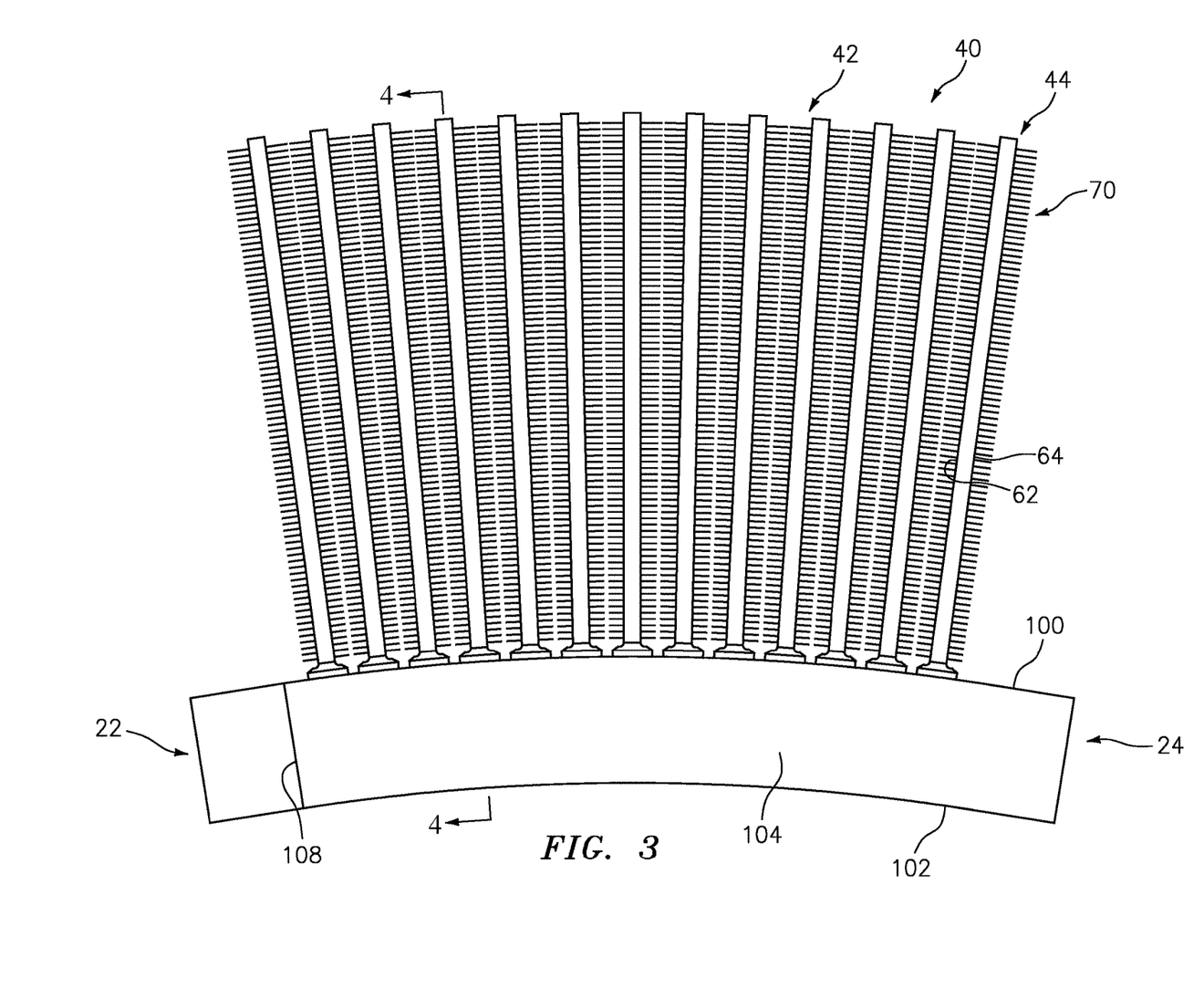
FIG. 3 is a front end view of the heat exchanger of FIG. 1.

Exemplary manifolds are metallic (e.g., nickel-based superalloy). The inlet manifold and outlet manifold may each have a respective fitting 30, 32 providing the associated port 22, 24. As is discussed further below, the inlet manifold and outlet manifold are coupled to heat exchanger plates (panels) of one or more exemplary plate banks 40 (FIG. 3). FIG. 2 also shows exemplary inlet manifold outlet ports 34 and outlet manifold inlet ports 36 for such coupling.

Figure 4:
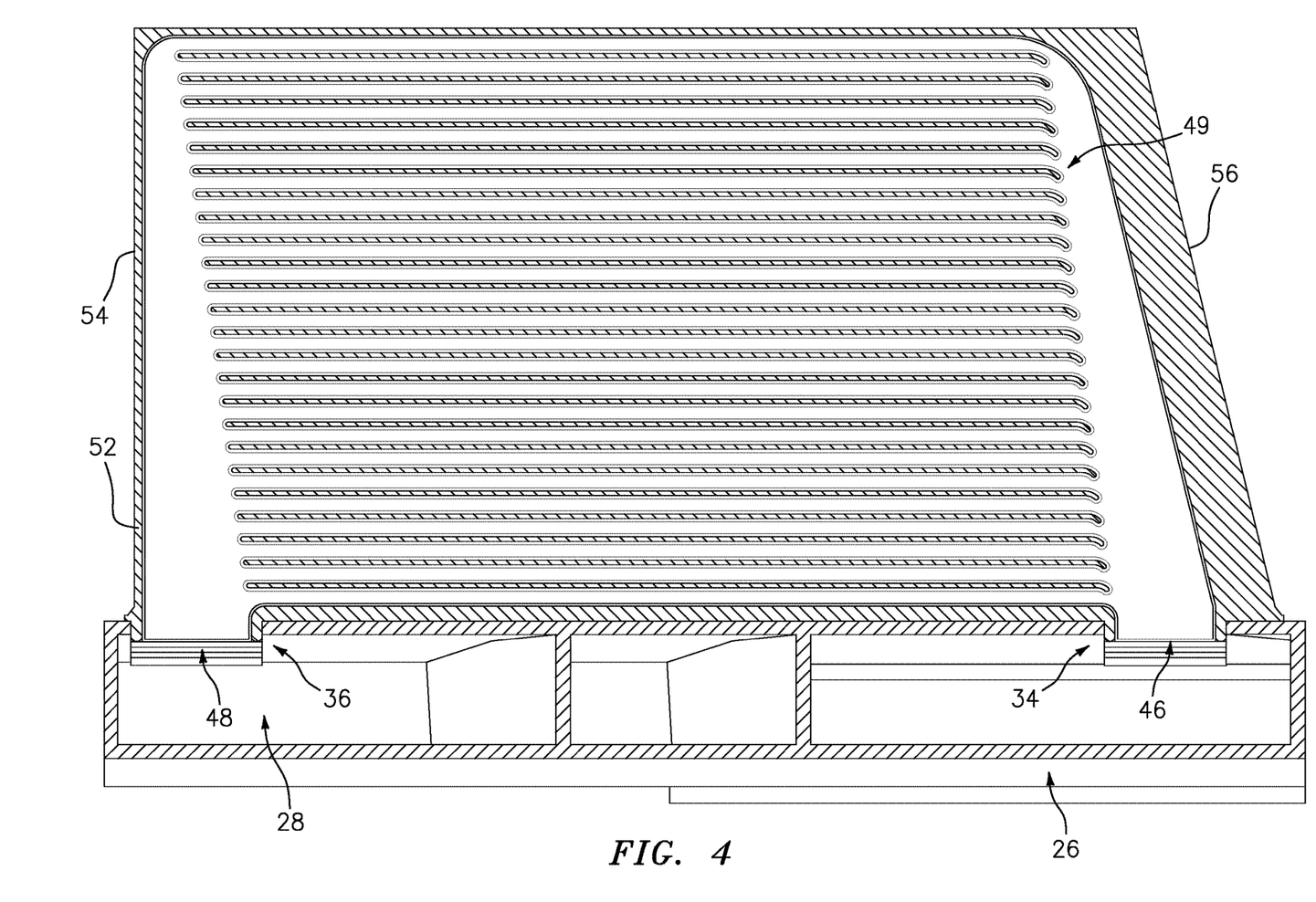
FIG. 4 is an axial/radial sectional view of the heat exchanger of FIG. 1 taken long line 4-4 of FIG. 3.

Each plate bank 40 comprises a circumferential array 42 (FIG. 3) of plates 44 (discussed further below). In the exemplary banks, the plates extend axially and radially relative to the axis 10. Thus, the plates diverge from each other in the outward radial direction. Each plate has an inlet port 46 (FIG. 4) mated to an associated inlet manifold outlet port 34 and an outlet port 48 mated to an associated outlet manifold inlet port 36 (e.g., plugs of the plate mated to sockets in an outer diameter wall of the respective manifold). Each plate has internal passageways 49 (example in FIG. 4 based on that of the '091 application) between the ports 46 and 48.

The schematic illustrations of the heat exchanger have environmental and other details such as shrouds, mounting hardware, deflectors/blockers, and structural brace hardware (if any) removed for purposes of illustration.

Figure 5:
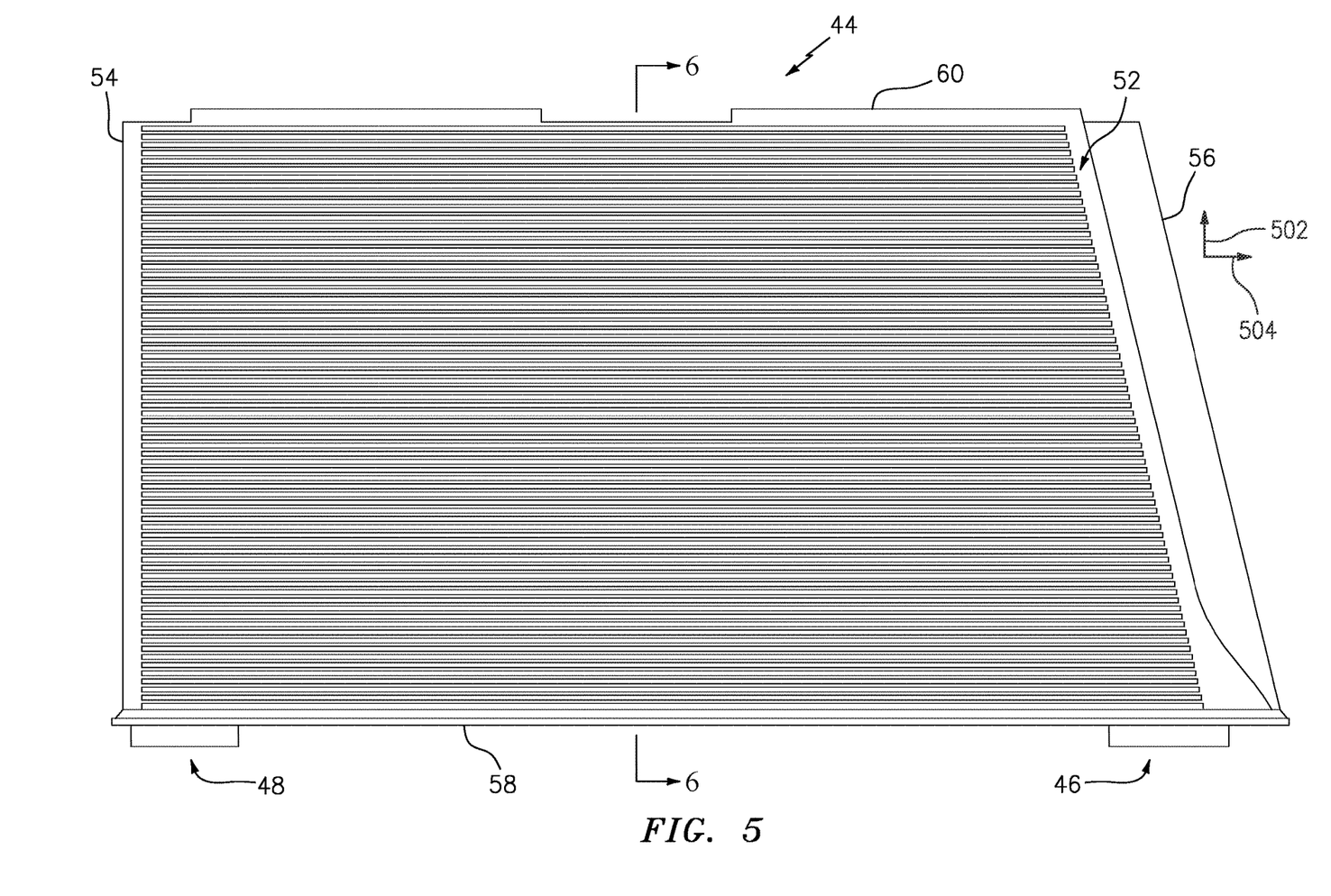
FIG. 5 is a side view of a plate of the heat exchanger.

Each plate 44 (FIG. 5) comprises a body or substrate 52 (e.g., cast or additively manufactured alloy such as nickel-based superalloy) having a leading edge 54, a trailing edge 56, an inboard or inner diameter (ID) edge 58, an outboard or outer diameter (OD) edge 60, a first circumferential (generally circumferentially facing) face 62 (FIG. 3) and a second circumferential face 64.

As is discussed below, one or both faces 62, 64 may bear fin arrays 70 (FIG. 6—shown for purposes of illustration with exaggerated progressive change in fin height relative to FIG. 3). The fins are separately formed (e.g., of folded sheetmetal—e.g., nickel-based superalloy) and secured (e.g., brazing, welding, diffusion bonding, and the like) to adjacent substrate(s) (generally see the '740 patent). As is discussed further below, exemplary fins are initially formed as square wave corrugations 72 (FIG. 7) of even height/amplitude whose troughs 73 (FIG. 7A) are secured to the associated face 62, 64. FIG. 7 show the height/amplitude direction as 506, normal to the face 62, 64 to which the corrugation is mounted and in the example, parallel to the ID edge 58 which has the plate ports 46, 48. A direction 502 of the wavelength is parallel to the associated face 62, 64 as is a direction of 504 (direction of symmetry) (FIG. 5) of the individual waves/corrugations. The corrugation has legs 74, 75 and peaks 76 and extends along the direction 502 from a first sectional end 77 (an inner diameter (ID) end in the example) to a second section end 78 (an outer diameter (OD) end in the example). Along the direction of the individual corrugations (streamwise of the ultimate second flow 912) the corrugation has a first end near the plate substrate upstream edge and a second end near the plate substrate downstream edge. In general, the term "plate" or "panel" may be applied at any of several levels of detail. It may identify a body or substrate of an assembly or the greater assembly or subassembly (e.g., a cast substrate plus one or more separately-attached fin arrays).

Figure 6:
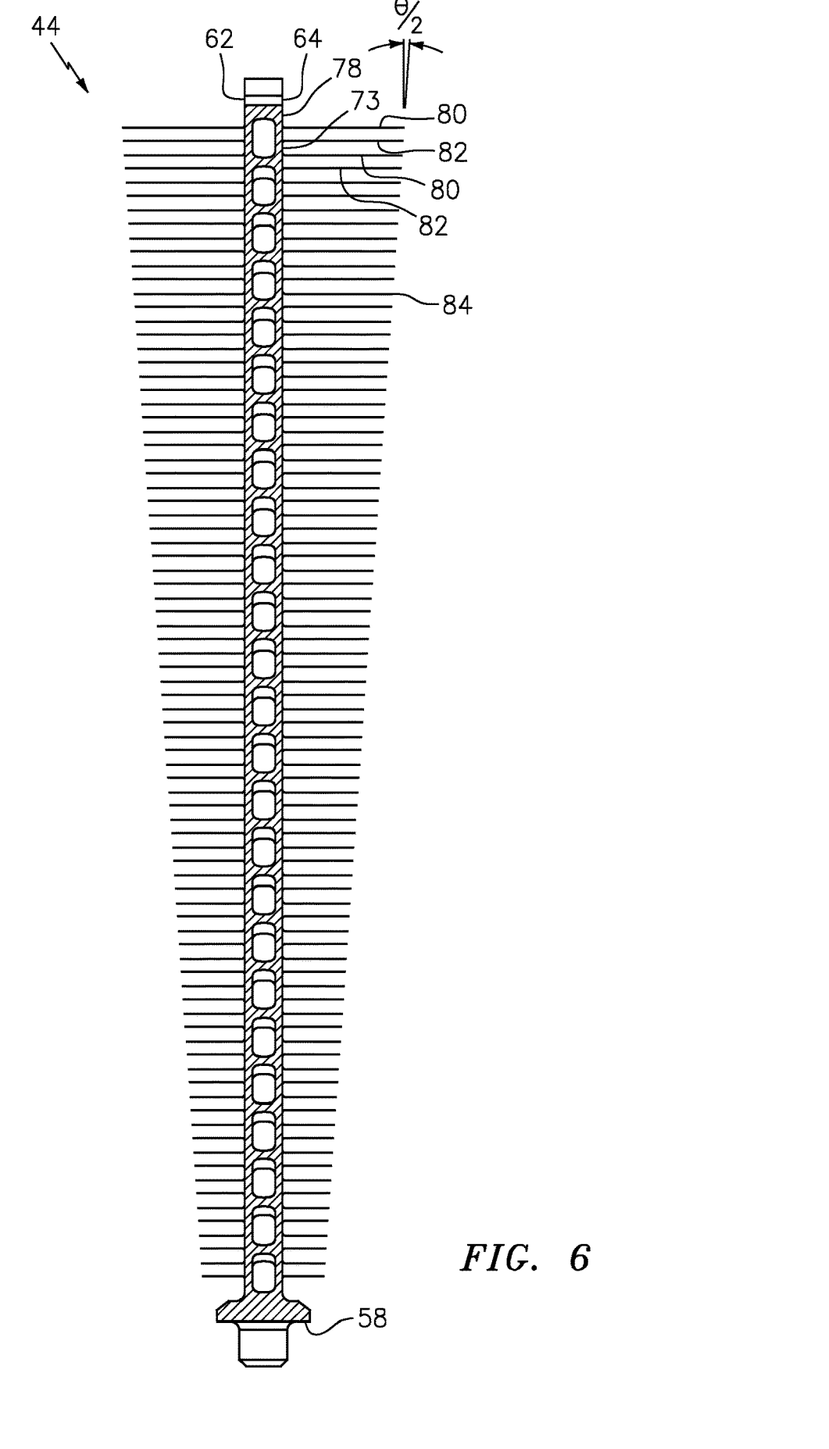
FIG. 6 is a transverse sectional view of the plate of FIG. 5 taken along line 6-6 with exaggerated fin height.
Figure 7:
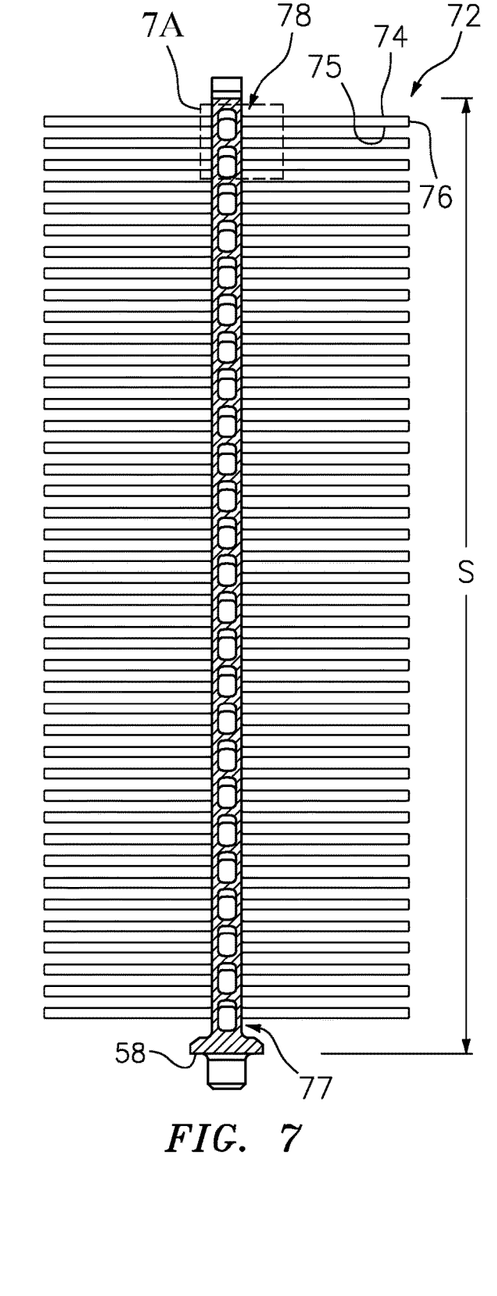
FIG. 7 is a transverse sectional view of a precursor of the plate of FIG. 6.
Figure 7A:
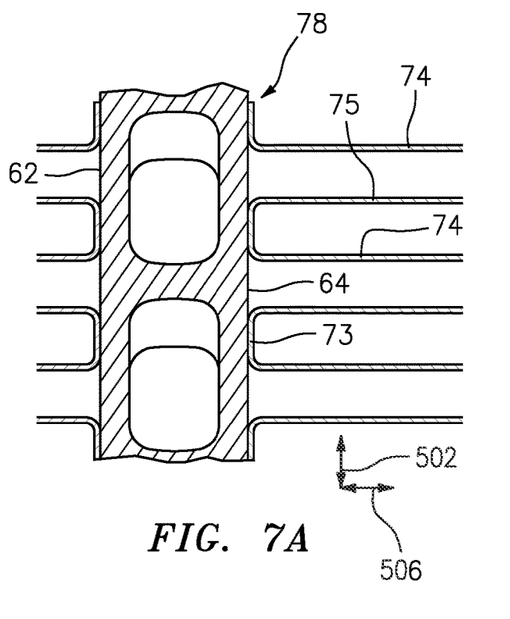
FIG. 7A is an enlarged view of the plate precursor of FIG. 7.

After the wave corrugation(s) are secured, the peaks 76 and portions of the legs 74, 75 are cut off to create discrete pairs of fins 80, 82 (FIG. 6). Each fin extends to a free distal end/edge 84 and each pair are joined by the intact trough 73. At the ends (ID and OD in the example) of the fin arrays, there may be boundary conditions whereby a single isolated fin exists secured by an isolated trough remnant.

Figure 8:
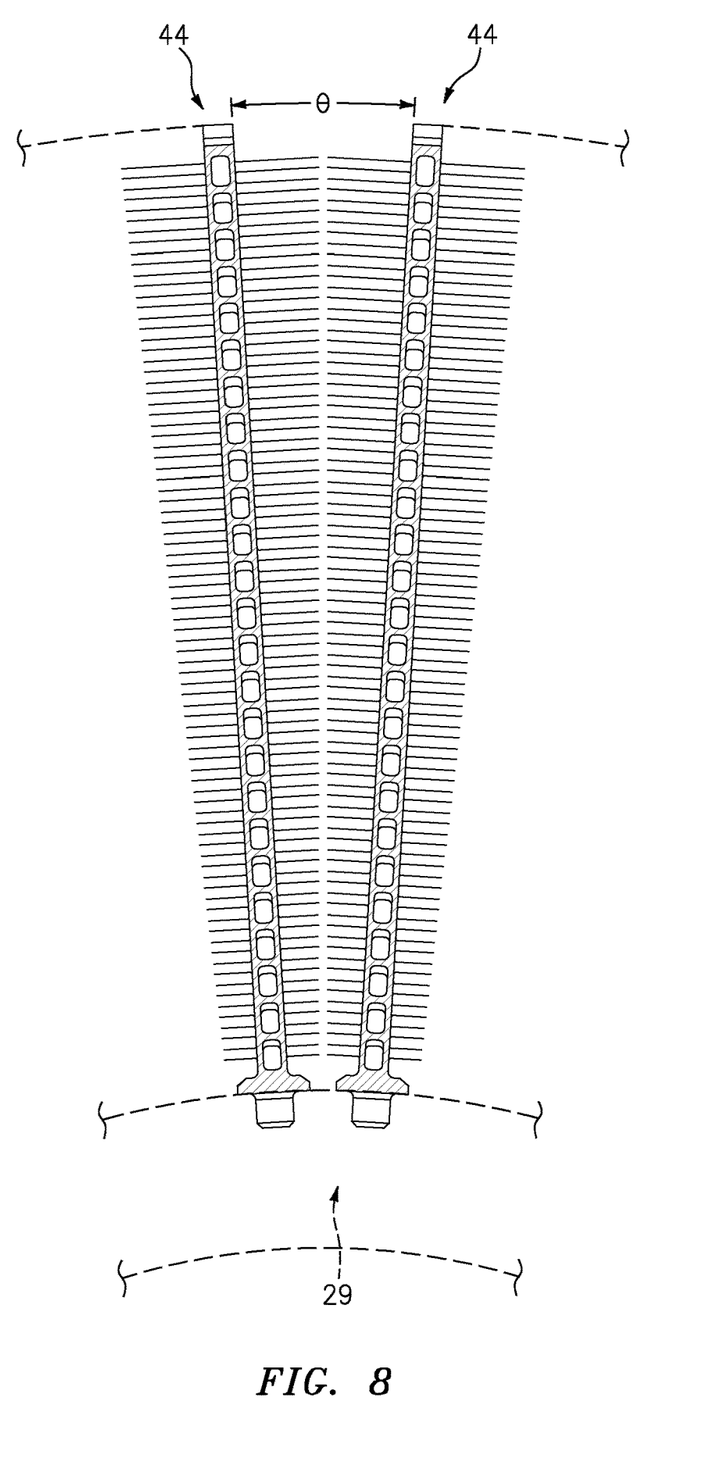
FIG. 8 is a partial view of multiple plates of FIG. 6 in a circumferential array in the heat exchanger.

The exemplary trimming or cutting provides a progressive change in fin height from the associated substrate surface 62, 64 in the direction 502. This allows a progressive proximal-to-distal change in spacing between adjacent plates. For example, FIG. 8 shows two adjacent plates extending exactly radially and diverging from each other by an angle θ. Exemplary θ is 0.5°-10.0°, more particularly, 0.5°-3.0°. The fins are thus trimmed at an angle θ/2 so that spacing between fin tips of adjacent plates is uniform. Thus, in the illustrated example, from the ID end of the fin array to the OD end, the fins progressively increase in height. Such fin divergence may be particularly advantageous for plates extending from an OD surface of an ID manifold; whereas a proximal-to-distal convergence would be advantageous for plates mounted to the ID surface of an OD manifold. Nevertheless, non-uniform spacing may be useful such as to allow greater clearance where there may be plate movement or differential thermal expansion.

Figure 9:
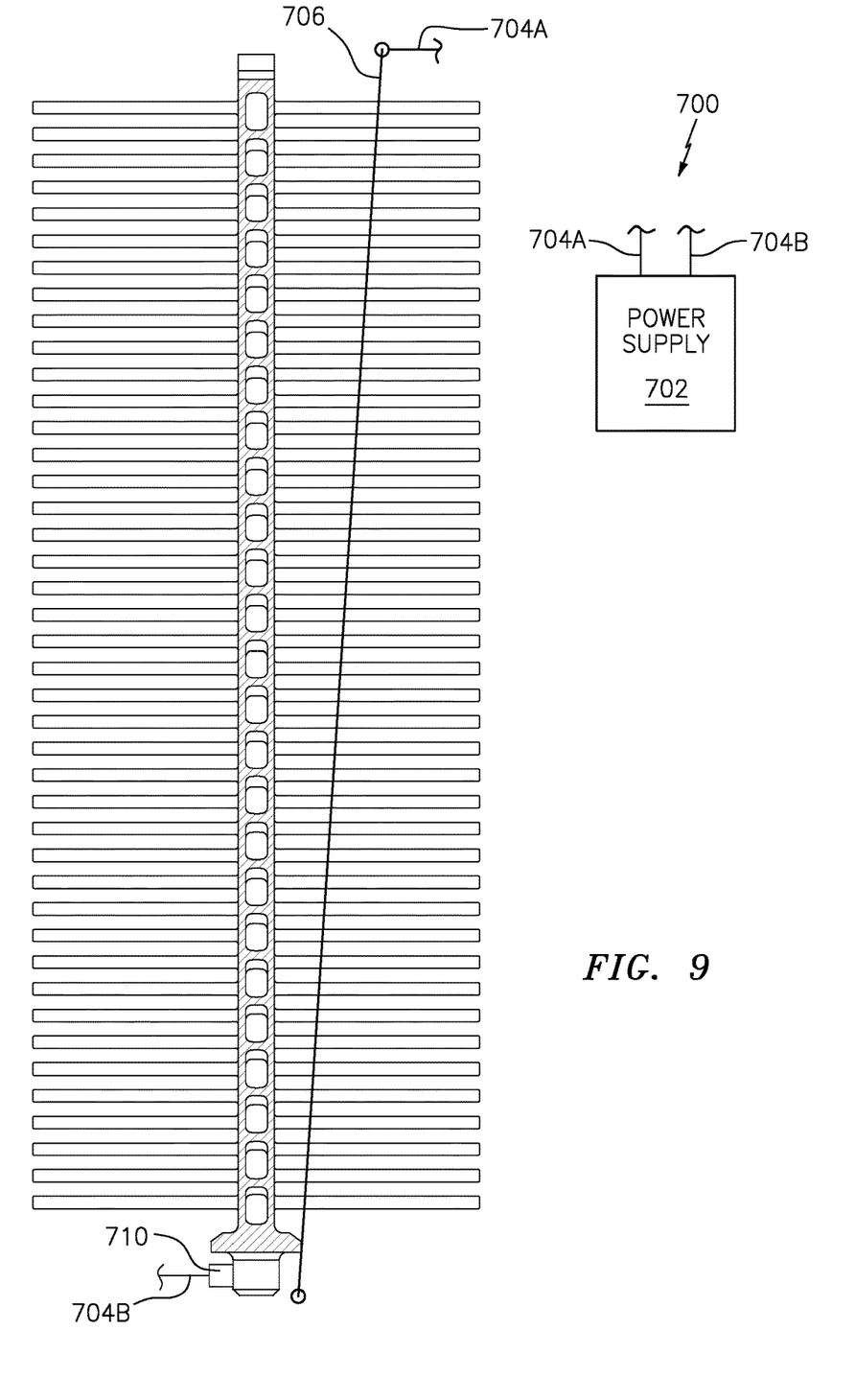
FIG. 9 is a view of the plate precursor during electro-discharge machining (EDM) of a fin array.

FIG. 9 shows a wire electro-discharge machining (EDM) system 700 for removing all peaks of a given wave corrugation 72 in a single traversal. The system 700 includes an EDM power supply 702 having leads 704A, 704B respectively electrically connected to an EDM wire 706 (e.g., directly or to a spool) and the plate precursor (e.g., by a clip or other electrical contact 710 engaging the fin precursor or the substrate). The exemplary wire is held at the angle θ/2 and traversed parallel to the corrugations (e.g., axially relative to the ultimate position of the exemplary plate in the exemplary heat exchanger). Other conventional EDM components such as the wire holder, spools, and manipulator and the conductive fluid in which all may be immersed are not shown.

Relative to the '740 patent, the progressive height increase post-cutting may have one of more of several advantages. In heat exchangers with progressive change in plate orientation (e.g., radial plates), the uniform amplitude of source stock may be less expensive than forming source stock of progressive amplitude change. Assembly may also be eased because a relatively precise registry may be required for the progressive amplitude wave to contact both adjacent plates. By having separate fins on each adjacent plate face, slight variations in gaps between facing fins of the two plates or other artifacts of inconsistency in fin position are of trivial consequence.

Although the illustrated example involves removing peaks from the entire span S (FIG. 7), smaller fractions are possible (e.g., along a radially inboard portion of the corrugation 72, leaving radially outboard peaks 76 intact. Thus an exemplary range is 50% to 100% of the span S or 75% to 100%.

Figure 10:
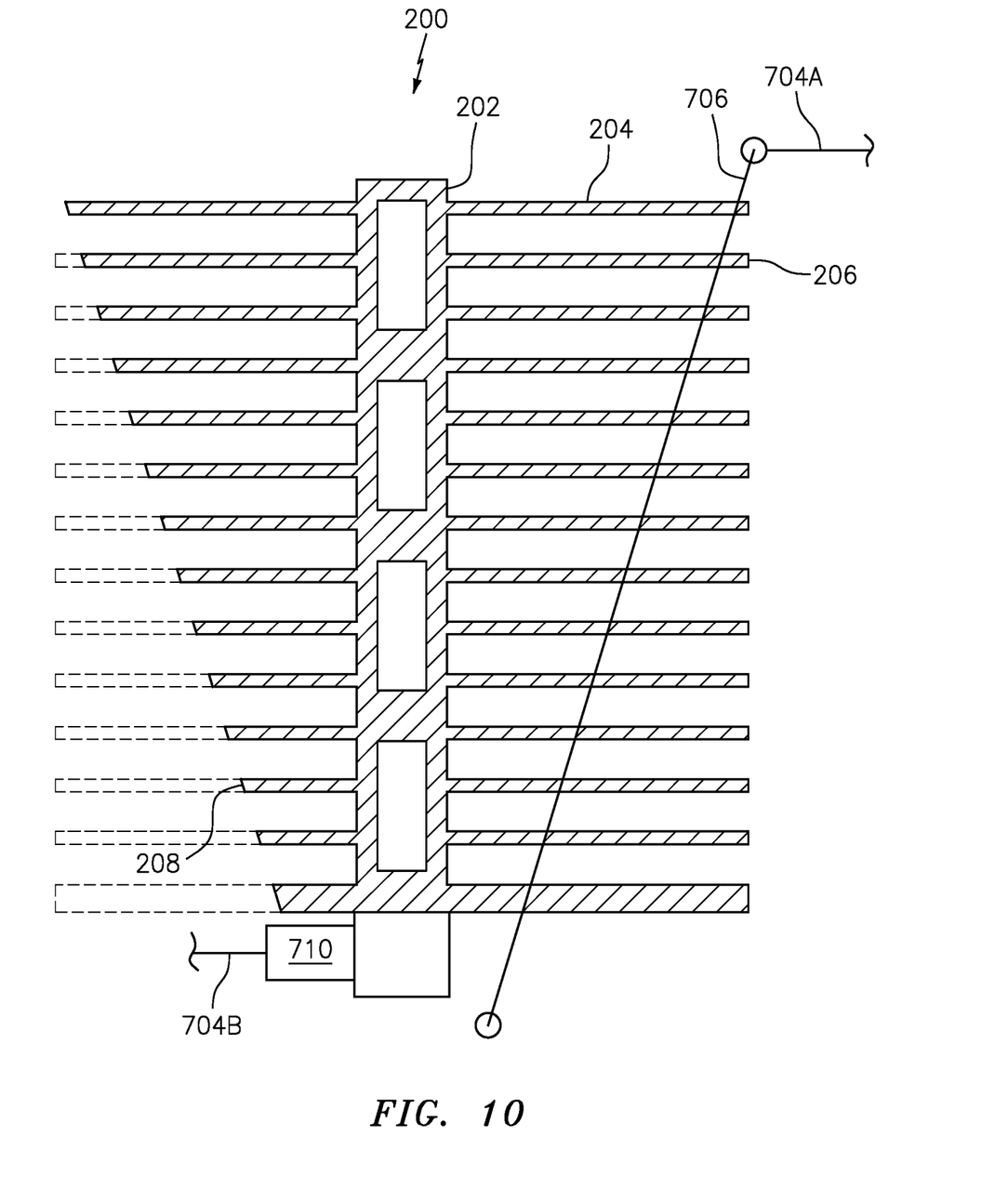
FIG. 10 is a view of an alternate plate precursor during electro-discharge machining (EDM) of a fin array.

FIG. 10 schematically shows an alternative plate 200 initially formed as a unitary piece (e.g., via casting) including a main body 202 and integral fins 204 extending from opposite faces of the main body. General details of the main body may be similar to those of the substrates 52 of the plates 44. The fins 204 initially extend to distal ends/tips 206. In an example of an initial plate precursor, this may effectively involve a uniform fin height. However, as with the plate 44, the fins on one or both sides may be cut to provide a progressive change in height along at least a portion of the area/footprint covered by the fins. FIG. 8 specifically shows fins on one side cut down leaving final cut fin tips 208 while the fins on the other side are in the process of being cut.

Figure 11:
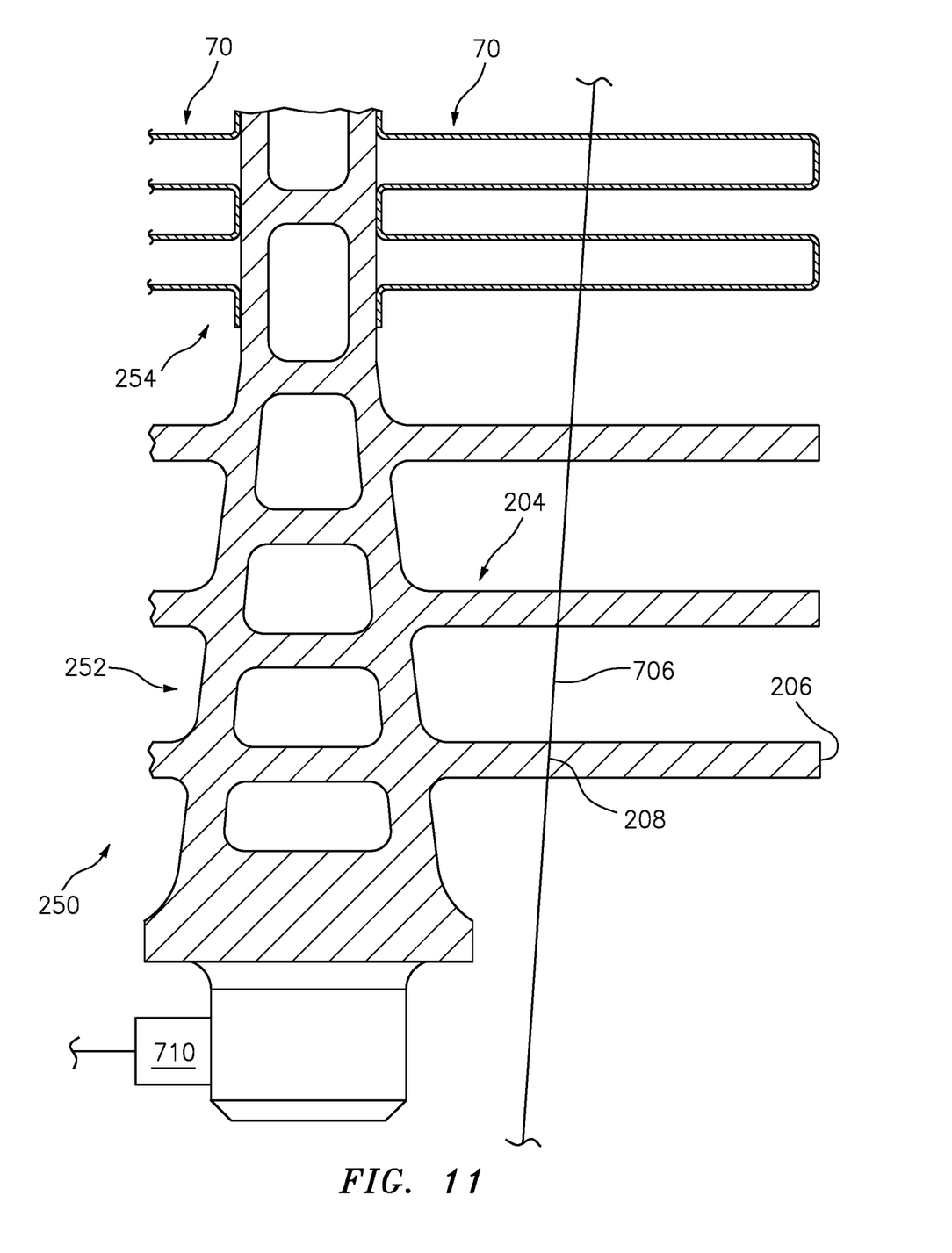
FIG. 11 is a view of a second alternate plate precursor during electro-discharge machining (EDM) of a fin array.

Additionally, combinations of cast fins and foil fins are possible and may be simultaneously cut. FIG. 11 show a plate 250 with one or more integrally cast fins 204 along each side of a proximal portion 252 of a body and foil-formed fins 70 along each side of a distal portion 254. Fins on the drawing left side are cut away for illustration and fins on the right side are in the process of being cut by wire EDM.

Although a reverse taper of final fin height is shown (height diverging from proximal to distal), other height profiles are possible including converging.

Figure 12:
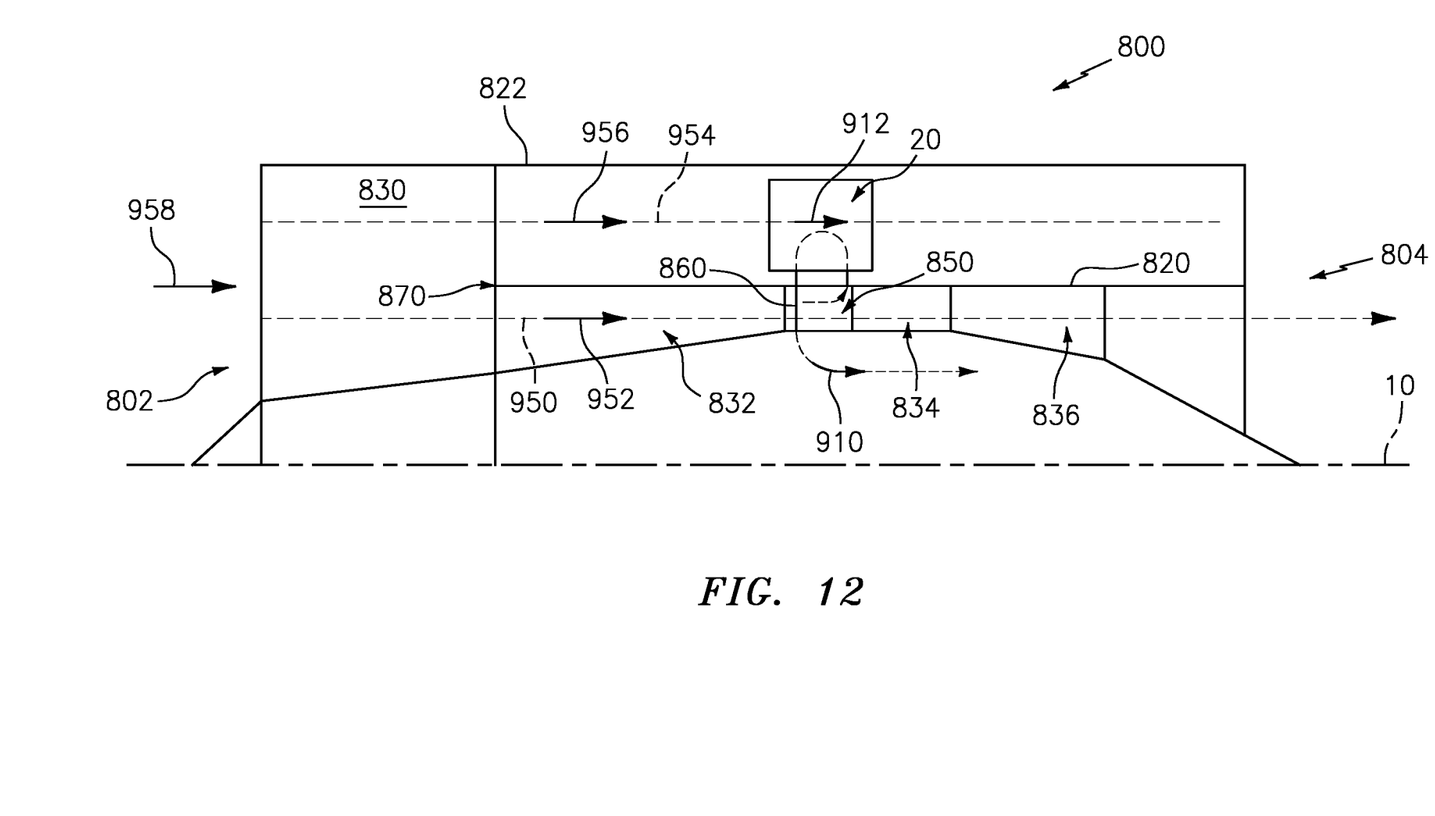
FIG. 12 is a schematic axial half section view of a gas turbine engine including the heat exchanger of FIG. 1.

FIG. 12 schematically shows a gas turbine engine 800 as a turbofan engine having a centerline or central longitudinal axis 10 and extending from an upstream end at an inlet 802 to a downstream end at an outlet 804. The exemplary engine schematically includes a core flowpath 950 passing a core flow 952 and a bypass flowpath 954 passing a bypass flow 956. The core flow and bypass flow are initially formed by respective portions of a combined inlet airflow 958 divided at a splitter 870.

A core case or other structure 820 divides the core flowpath from the bypass flowpath. The bypass flowpath is, in turn, surrounded by an outer case 822 which, depending upon implementation, may be a fan case. From upstream to downstream, the engine includes a fan section 830 having one or more fan blade stages, a compressor 832 having one or more sections each having one or more blade stages, a combustor 834 (e.g., annular, can-type, or reverse flow), and a turbine 836 again having one or more sections each having one or more blade stages. For example, many so-called two-spool engines have two compressor sections and two turbine sections with each turbine section driving a respective associated compressor section and a lower pressure downstream turbine section also driving the fan (optionally via a gear reduction). Yet other arrangements are possible.

FIG. 12 shows the heat exchanger 20 positioned in the bypass flowpath so that a portion of the bypass flowpath 954 becomes the second flowpath 902 and a portion of the bypass flow 956 becomes the second airflow 912.

The exemplary first airflow 910 is drawn as a compressed bleed flow from a diffuser case 850 between the compressor 832 and combustor 834 and returned radially inwardly back through the core flowpath 950 via struts 860. Thus, the flowpath 900 is a bleed flowpath branching from the core flowpath.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A method for forming a heat exchanger plate, the method comprising:
   securing a wave form metallic sheet having a plurality of waves to a heat exchanger plate substrate, the substrate comprising a first face and a second face opposite the first face, the securing of the wave form metallic sheet being of troughs of the wave form to the first face; and
   after the securing, cutting off peaks of the wave form metallic sheet to create pairs of fins, each fin extending to a free distal end and the fins of each pair joined by an intact trough of the wave form metallic sheet.

2. The method of claim 1 wherein:
   the cutting off comprises electro-discharge machining.

3. The method of claim 2 wherein:
   the electro-discharge machining comprises wire electro-discharge machining.

4. The method of claim 3 wherein:
   the wire electro-discharge machining comprises a wire removing the peaks in a single traversal.

5. The method of claim 1 further comprising:
   securing a second wave form metallic sheet to the second face; and
   cutting off peaks of the second wave form metallic sheet.

6. The method of claim 1 wherein:
   the cutting off removes progressively more from one peak of the wave to the next across a majority of a footprint of the sheet.

7. The method of claim 1 wherein:
   the wave form is a square wave form.

8. The method of claim 1 wherein:
   the securing comprises brazing.

9. The method of claim 1 wherein:
   the substrate comprises a casting.

10. The method of claim 1 wherein:
    the substrate comprises a first edge having at least one port; and
    the amplitude directions of the waves of the wave form are within 10° of parallel to the first edge.

11. A method for forming a heat exchanger, the method comprising:
    forming, according to the method of claim 1 a plurality of heat exchanger plates each having a respective said heat exchanger plate substrate; and
    securing the plurality of heat exchanger plates to at least one manifold with a progressively varying orientation.

12. The method of claim 11 wherein:
    the at least one manifold is arcuate; and
    the arcuateness provides the progressively varying orientation.

13. The method of claim 11 wherein each said substrate comprises:
    at least one port mated to the manifold; and
    at least one internal passageway.

14. A method for forming a heat exchanger plate from a substrate and a metallic corrugation, wherein:
    the substrate comprises:
        a first face and a second face opposite the first face;
        at least one first port and at least one second port; and
        at least one passageway along a flowpath between the at least one first port and the at least one second port;

the metallic corrugation comprises:
a plurality of peaks and a plurality of troughs; and
the method comprises:
securing the troughs of the metallic corrugation to the substrate first face; and
after the securing, cutting the peaks off the metallic corrugation to leave pairs of fins,
wherein for each pair the fins are connected by the associated trough and each fin extends to a respective free distal end.

15. The method of claim 14 wherein:
the cutting comprises electro-discharge machining.

16. The method of claim 15 wherein:
the electro-discharge machining comprises wire electro-discharge machining.

17. The method of claim 16 wherein:
the wire electro-discharge machining comprises a wire removing the peaks in a single traversal.

18. The method of claim 14 wherein:
the securing comprises welding, brazing or diffusion bonding.

19. The method of claim 14 wherein:
the substrate further comprises a plurality of integrally-formed fins; and
the cutting cuts the integrally-formed fins simultaneously with the cutting the peaks.

20. The method of claim 14 wherein the metallic corrugation is a first metallic corrugation:
the method further comprises:
securing troughs of a second metallic corrugation to the substrate second face; and
after the securing the troughs of the second metallic corrugation, cutting peaks off the second metallic corrugation to leave pairs of fins, wherein for each pair the fins are connected by the associated trough and each fin extends to a respective free distal end.

21. A method for forming a heat exchanger, the method comprising:
forming, according to the method of claim 14, a plurality of heat exchanger plates each having a respective said heat exchanger plate substrate; and
securing the plurality of heat exchanger plates to at least one manifold with a progressively varying orientation.

22. The method of claim 21 wherein the manifold comprises:
an inlet manifold having at least one inlet port and at least one outlet port; and
an outlet manifold having at least one outlet port and at least one inlet port, a first flowpath passing from the at least one inlet port of the inlet manifold, through the at least one passageway of each of the plurality of heat exchanger plates, and through the at least one outlet port of the outlet manifold.

* * * * *